Jan. 6, 1931.  S. M. PHELPS ET AL  1,788,123
REFRACTORY
Original Filed April 7, 1926
Fig. I.
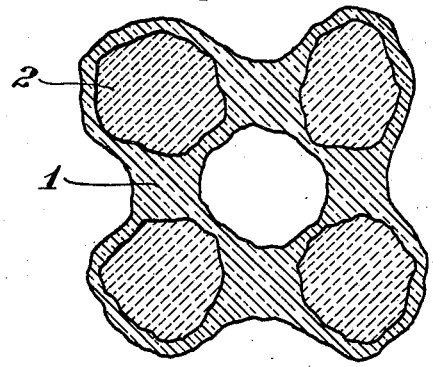
Fig. II.
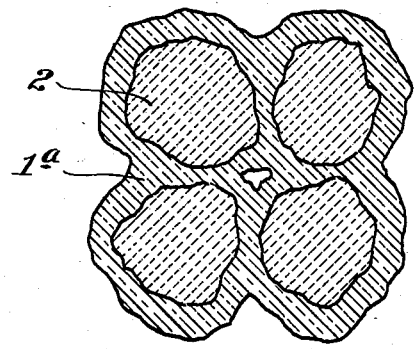
WITNESS
INVENTOR Patented Jan. 6, 1931

1,788,123

UNITED STATES PATENT OFFICE

STUART M. PHELPS, OF PITTSBURGH, PENNSYLVANIA, AND MACDONALD C. BOOZE, OF WYOMING, OHIO, ASSIGNORS TO AMERICAN REFRACTORIES INSTITUTE, OF PITTSBURGH, PENNSYLVANIA, A CORPORATION OF PENNSYLVANIA

REFRACTORY

Continuation of application Serial No. 100,272, filed April 7, 1926. This application filed April 25, 1928. Serial No. 272,688.

Our invention relates to the production of refractories, that is to say, bricks, furnace linings, and other specific articles, out of material which is of highly refractory nature. More particularly, it relates to the production of such articles from diaspore clay and such highly aluminous porous materials of natural occurrence used in this industry as shrink excessively in firing. This application is a continuation of an application filed by us April 7, 1926, Serial No. 100,272. Hitherto a difficulty has attended the use of refractory articles formed of diaspore, in that under the high and widely ranging temperatures of service, there is continuing shrinkage of very appreciable magnitude. Our invention consists in a particular treatment incident to the preparation of the diaspore and to the formation of refractory articles from it, in consequence of which the material is initially shrunk to a high degree, and correspondingly lowered in porosity, and accordingly the article when formed will give more satisfactory service than hitherto has been the case and will occupy a broadened field of application. This without appreciable diminution of its essential, refractory character. Incidentally, we have found that the refractory of our invention possesses an unusual and unexpected toughness and hardness, greatly exceeding in these respects the material produced by usual procedure. This is exceedingly advantageous, for refractory brick of this type are relatively fragile and suffer breakage and abrasion in shipment and there is loss due to abrasive action in service.

The accompanying drawing will serve to illustrate the invention in a diagrammatic way. The two figures are ideal cross-sections showing, greatly magnified, a small part of the mass of a body of diaspore, and illustrating the theory of the change in condition which is brought about in the practice of our invention.

We shall, as a matter of convenience, describe the invention as incident to the usual brick-making operation. In the sequel we shall allude to wider fields of practice. In the customary production of bricks from diaspore, the native material is calcined, crushed, mixed with a bond, worked to plastic condition, ordinarily with water, shaped, and finally the dried shaped brick is burned. In this procedure there are two heating steps; the first, the calcining step, practiced upon the native diaspore, the second, the burning step, conducted upon the shaped and preliminarily cured brick. And the brick in service, of course, when built into the furnace lining, is repeatedly and for long intervals of time brought to and maintained at high temperature. In each and all of these high-temperature stages, the material tends to shrink. We have perceived, and from this perception our invention proceeds, that when the material is so highly heated, the material undergoes a particular change in its minute structure: two forms or conditions of the component substance or substances manifest themselves. Part of the substance occurs as small grains or oolites imbedded in a matrix of less refractory substance, the behavior of which governs to a large extent the shrinkage of the mass. This condition is illustrated in Fig. I, in which the bond of the aggregate is indicated at 1, and the unchanged and more refractory particles at 2.

We have discovered, and herein lies our invention, that by adding to the material under treatment, consisting essentially of diaspore in clay, one or another of certain materials in a very fine state of division, and in measured proportion, the material so added will, in the ensuing high-temperature step serve to effect a change in the structure of the mass, so as to cause the refractory particles to be drawn more closely together than otherwise would be the case with reasonable heating. This phenomenon manifests itself in accelerated and increased shrinkage. Fig. II of the drawings will in comparison with Fig. I show the condition so brought about. The bond of the substance is modified by the presence of the added material, and in consequence the particles 2 move more freely and more quickly together. The material added may in a general sense be termed a flux; its actual value lies in the shrinkage which under the conditions indicated occurs. The heating need not be such as to result in or produce complete vitrifaction; it is the shrinkage which is important. Furthermore, the material added (which, if added in relatively large proportion, would effect such a modification of the substance as to take it out of the class of highly refractory materials), being added in relatively small and measured proportion does not, as we have discovered, have that prejudicial effect.

We preferably add the activating material to the diaspore while the latter is still in its native condition, and effect in the initial calcining operation the shrinkage which is the essential feature of our invention.

The material employed as an addition must be such that it will not effect a weakening of the brick for its intended uses. Specifically, we have found the following substances effective, and to the several degrees indicated. Whereas the native diaspore, consisting in this instance of aluminum oxide 72% shrank under calcining treatment about 14% in volume, with the addition of

| | | |
|---|---|---|
| Aluminum acetate | 5% | the shrinkage was 18% |
| Aluminum phosphate | 5% | the shrinkage was 19.5% |
| Aluminum borate | 5% | the shrinkage was 19.7% |
| Alunite | 5% | the shrinkage was 23% |
| Dry sodium silicate | 5% | the shrinkage was 25.5% |
| Cryolite | 5% | the shrinkage was 28.4% |
| Magnesium pyrophosphate | 5% | the shrinkage was 30.5% |
| Canadian apatite | 5% | the shrinkage was 32% |
| Canadian apatite | 2% | the shrinkage was 24% |
| Magnesium oxide | 2% | the shrinkage was 32.5% |
| Magnesium oxide | 1% | the shrinkage was 24.1% |
| Phosphate rock | 5% | the shrinkage was 33% |
| Phosphate rock | 2% | the shrinkage was 23% |
| Aluminum phosphate | 10% | the shrinkage was 36% |
| Magnesium oxide | 5% | the shrinkage was 39.5% |
| Calcium aluminate | 5% | the shrinkage was 28.2% |
| Calcium oxide | 4% | the shrinkage was 27.1% |

Other materials tried with varying results were, feldspar, litharge, glass, borates, zinc oxide, barium oxide, rutile, and phosphorous gases.

It will thus be perceived that a wide range of mineral additions is available to attain our end.

We have said above that the addition of other substances must be such that it will not effect a weakening of the brick for its intended uses. In making this statement we recognize the fact that refractories have hitherto been made by mixing with aluminous material, such as bauxite, relatively large quantities of other material, such for instance as magnesite, and in those prior practices initial shrinkage has it is true been effected. But the substance itself has been changed; the refractory can no longer be spoken of as aluminum oxide. It would be classified as a spinel or magnesium aluminate, and would not offer the same chemical properties as the comparatively pure alumina material with which we have to do, and would be incapable of serving the same ends. The objections to this spinel are the low-melting compounds which are formed when this material is in contact at high temperatures with silicates.

The spinel is, chemically speaking, more basic in character and therefore is incapable of serving in the same manner as comparatively pure alumina serves in reaction with slags, for example. In the present development of industry, this material for these reasons has not found wide use. It is our invention that by proper control and limitation of the quantity of material added, as exemplified in the foregoing table, the desired initial shrinkage may be gained, and yet without disadvantage. Specifically, in the case of phosphate rock, whereas the addition of quantities as great as 20% would have marked effect to change the chemical properties of the substance, the addition of two or three or even 5% would have no such appreciable effect, but would on the other hand effect those good ends which we have indicated. The line of division may not be sharply drawn, and it is in some degree variable, depending on the composition and physical properties of the raw material. We believe ourselves to be, however, the first to explore the regions of low additions, and we confine our invention to additions which amount to as much as 10%, within which region our good ends will be got, without appreciable disadvantage. And within such range of 10% and less, no one hitherto has explored.

As already we have intimated we preferably combine the addition with the diaspore before calcining.

We have described our invention in detail in its application to diaspore clay; as we indicated at the beginning it may be practiced with such modification as the art knows upon other aluminous material; bauxite, for example.

The production of the refractory article may be varied in those respects known to the art. Other articles than bricks may be made, various shapes,—tiles, tuyères, etc. Our invention is applicable, whatever be such variations in procedure.

If as we prefer to do, the material which augments shrinkage be combined at the outset with the native material, and great shrinkage be effected in the initial calcining, the material then may be employed when worked to plastic as furnace lining shaped in situ.

We claim as our invention:

The method herein described of dealing with alumina-containing material which shrinks excessively in firing, which method consists in mixing with the material phosphate rock in a ratio not exceeding 10%, and calcining the mixture.

In testimony whereof we have hereunto set our hands.

STUART M. PHELPS.
MACDONALD C. BOOZE.